(12) United States Patent
Siegler et al.

(10) Patent No.: US 7,520,308 B2
(45) Date of Patent: Apr. 21, 2009

(54) DRIVE UNIT FOR CONTROLLING RECIPROCATING ELECTROMAGNETS

(75) Inventors: David W. Siegler, New Berlin, WI (US); Thomas P. Gilmore, Wauwatosa, WI (US); William D. Straw, Hales Corners, WI (US)

(73) Assignee: Rockwell Automation Technologies, Inc., Mayfield Hieghts, OH (US)

( * ) Notice: Subject to any disclaimer, the term of this patent is extended or adjusted under 35 U.S.C. 154(b) by 850 days.

(21) Appl. No.: 11/098,050

(22) Filed: Apr. 4, 2005

(65) Prior Publication Data
US 2006/0220599 A1 Oct. 5, 2006

(51) Int. Cl.
*B32B 37/00* (2006.01)
(52) U.S. Cl. .................. 156/359; 156/64; 156/73.5; 156/580; 700/302
(58) Field of Classification Search .......... 156/64, 156/73.5, 358, 359, 580; 700/299, 301, 302
See application file for complete search history.

(56) References Cited

U.S. PATENT DOCUMENTS

| 5,530,326 | A  | * | 6/1996 | Galvin et al.   | 318/400.11 |
| 6,364,977 | B1 | * | 4/2002 | Simon           | 156/64     |
| 6,730,182 | B2 | * | 5/2004 | Yamazaki et al. | 156/73.5   |
| 6,733,605 | B1 | * | 5/2004 | Lamping et al.  | 156/64     |

* cited by examiner

*Primary Examiner*—James Sells
(74) *Attorney, Agent, or Firm*—Quarles & Brady LLP; Alexander R. Kuszewski (57) ABSTRACT

A drive unit for use with a vibration welder having first and second electromagnets, each having first and second terminals, and being operable to reciprocate a vibration platen, includes phase U, V, and W drive circuitry and control circuitry. The phase U drive circuitry is coupled to the first terminal of the first electromagnet. The phase V drive circuitry is coupled to the first terminal of the second electromagnet. The phase W drive circuitry is coupled to the second terminals of the first and second electromagnets. The control circuitry is operable to control the phase U, V, and W drive circuitry to generate a first drive signal for energizing the first electromagnet and a second drive signal for energizing the second electromagnet.

26 Claims, 9 Drawing Sheets

DRIVE UNIT FOR CONTROLLING RECIPROCATING ELECTROMAGNETS

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to industrial control and, more particularly, to a drive unit for controlling reciprocating electromagnets.

Vibration welding is an industrial process for creating a weld joint coupling two items, typically formed of thermoplastic material. In a linear vibration welding process, one of two parts is moved to slide across the other in a reciprocating fashion under pressure, creating heat through surface friction that melts and welds the parts together at the interface of the parts. As the melted material cools, a molecular bond is formed between the joined surfaces completing the weld.

Linear vibration welders are designed with electromagnetic heads to reduce wear and the need for lubrication associated with bearing surfaces. To control the motion of the reciprocated part, two electromagnets operate in a reciprocating fashion to move a vibration platen to which the part to be moved is secured. By controlling the amplitude and frequency of the drive signals applied to the electromagnets, the platen can be horizontally reciprocated to facilitate the welding process.

If the drive signals applied to the electromagnets are not precisely controlled, one electromagnet may still be energized as the other electromagnet is activated. Hence, the electromagnets pull the platen in opposite directions. This fighting between the electromagnets, repeated every cycle, increases mechanical stresses on the welder, and reduces the efficiency of the process. Vibration welding operations are controlled based on the amplitude and frequency of the platen movement. Competition between the electromagnets reduces the effectiveness at which these variable may be controlled.

Previous techniques for generating the electromagnet drive signals have involved the use of a 3 phase motor drive unit in conjunction with a Scott-T transformer and filter to perform a 3-2 phase transformation. This approach creates a resonance condition, and the drive signals are not completely synchronized, such that competition exists between the electromagnets.

Hence, it would be desirable to control the electromagnets such that only one of the magnets is activated at any particular time to reduce mechanical stress and increase efficiency.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

BRIEF SUMMARY OF THE INVENTION

The present inventors have recognized that a three-phase drive unit may be configured to control the drive signals applied to the reciprocating electromagnets of a vibration welder to ensure that the drive signals are precisely 180 degrees out of phase to thereby eliminating competition between the electromagnets.

One aspect of the present invention is seen in a drive unit for use with a vibration welder having first and second electromagnets, each having first and second terminals, and being operable to reciprocate a vibration platen. The drive unit includes phase U, V, and W drive circuitry and control circuitry. The phase U drive circuitry is coupled to the first terminal of the first electromagnet. The phase V drive circuitry is coupled to the first terminal of the second electromagnet. The phase W drive circuitry is coupled to the second terminals of the first and second electromagnets. The control circuitry is operable to control the phase U, V, and W drive circuitry to generate a first drive signal for energizing the first electromagnet and a second drive signal for energizing the second electromagnet.

Another aspect of the present invention is seen a vibration welder incorporating the drive unit and reciprocating the vibration platen to form a weld between two parts, one operably mounted to the vibration platen and the other mounted in a stationary fashion.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential".

Figure 1:
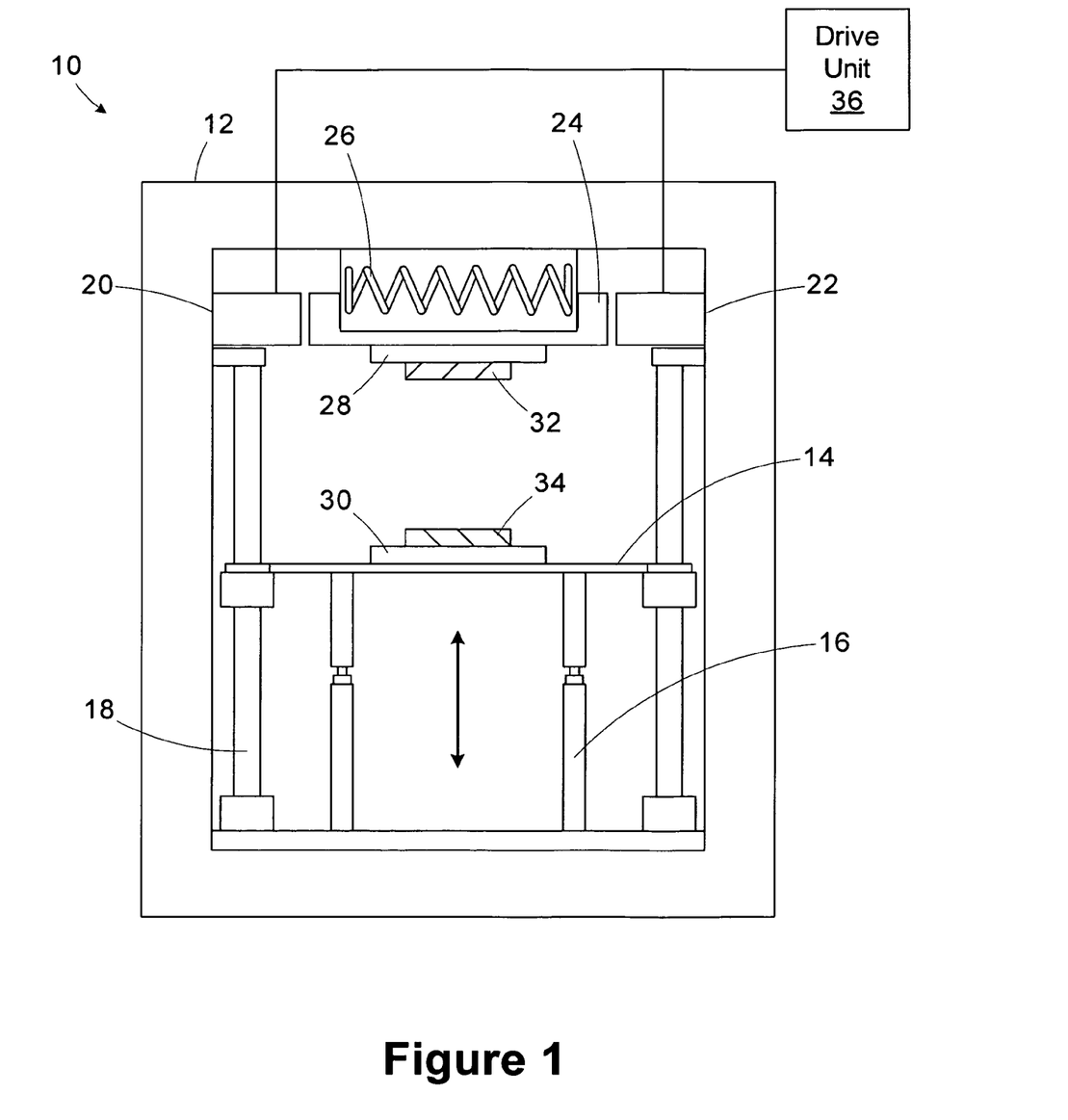
FIG. 1 is a diagram of a vibration welder in an open position.

Referring now to the drawings wherein like reference numbers correspond to similar components throughout the several views and, specifically, referring to FIG. 1, the present invention shall be described in the context of a vibration welder 10. FIG. 1 represents a pictorial representation of the vibration welder 10 to aid in the discussion of its operation, and is not intended to show a schematic of such a machine. The vibration welder 10 includes a housing 12 supporting a lift table 14, pressure cylinders 16, slide poles 18, electromagnets 20, 22, a vibration platen 24, a spring assembly 26, an upper tooling 28, a lower tooling 30, first and second parts 32, 34 to be welded, and a drive unit 36. A commercially available vibration welder 10 suitable for use with the present invention is a model VWB3500 or VWB3700 offered by Dukane Corporation of St. Charles, Ill.

The lift table 14 is moved within the housing 12 by the pressure cylinders 16. The lift table 14 is slidably attached to the slide poles 18 to allow vertical movement. In the arrangement illustrated in FIG. 1, the vibration welder 10 is in a position for loading the parts 32, 34. The first part 32 is secured by the upper tooling 28, and the second part 34 is secured by the lower tooling 30. Subsequently, the lift table 14 is lifted by the pressure cylinders 16 such that the second part 34 contacts the first part 32, as illustrated in FIG. 2.

Figure 2:
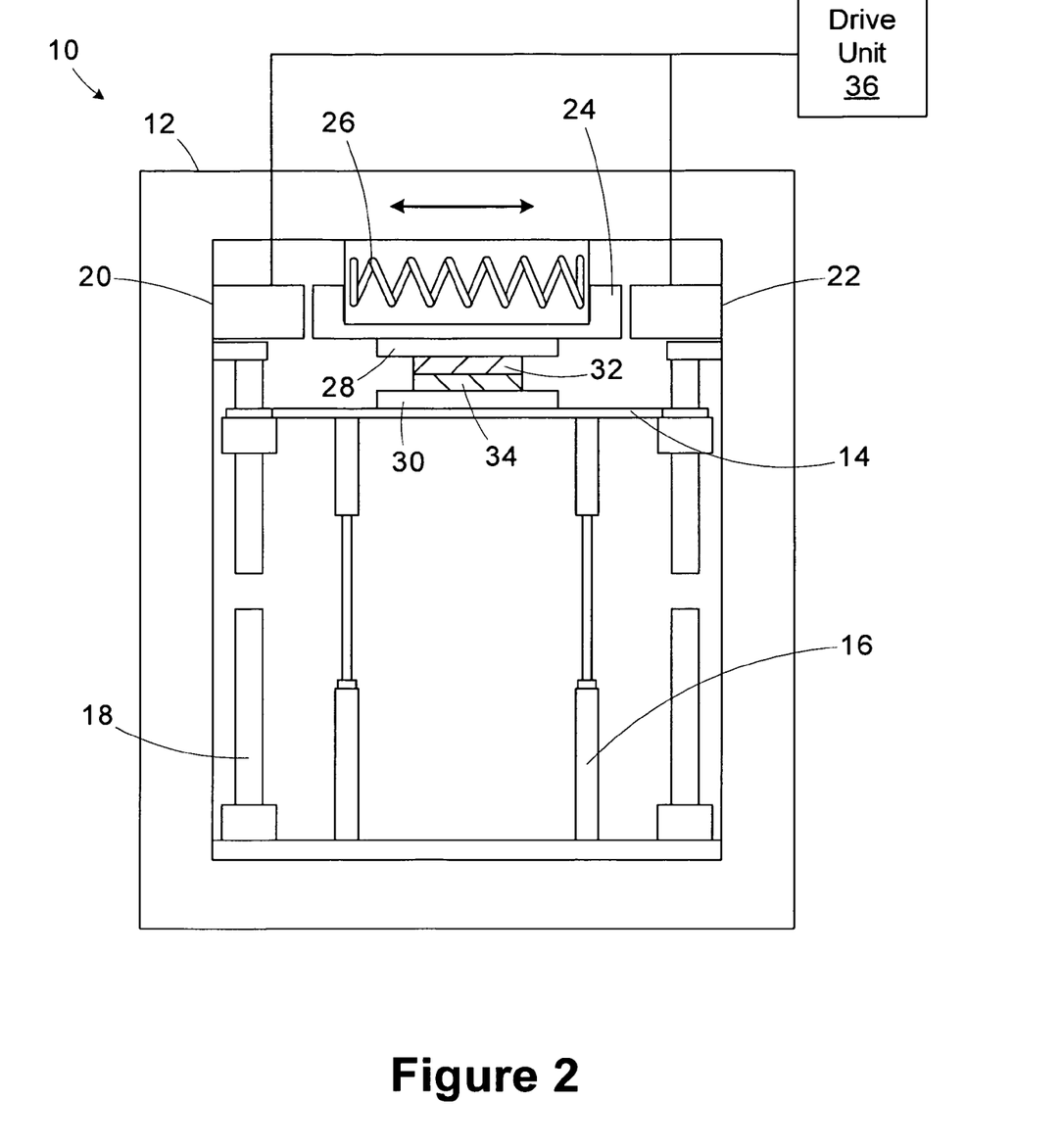
FIG. 2 is a diagram of the welder of FIG. 2 in a closed position.

Referring to FIG. 2, the pressure cylinders 16 control the force applied to the interface between the parts 32, 34 during the welding process. The drive unit 36 applies drive signals to the electromagnets 20, 22 causing them to alternately attract the vibration platen 24 and thereby cause the upper tooling 28 and attached first part 32 to move horizontally in a reciprocating fashion. The spring assembly 26 is mounted to the housing 12 and provides a biasing force that centers the vibration platen 24 between alternating activations of the electromagnets 20, 22. The magnitude and speed of the induced motion is determined by the magnitude and frequency of the drive signals provided by the drive unit 36 to the electromagnets 20, 22. Together, the upward pressure applied by the pressure cylinders 16 and the reciprocating motion caused by the electromagnets 20, 22 create friction between the parts 32, 34 at their interface, causing the thermoplastic material to melt and facilitate the vibration welding process.

Figure 3:
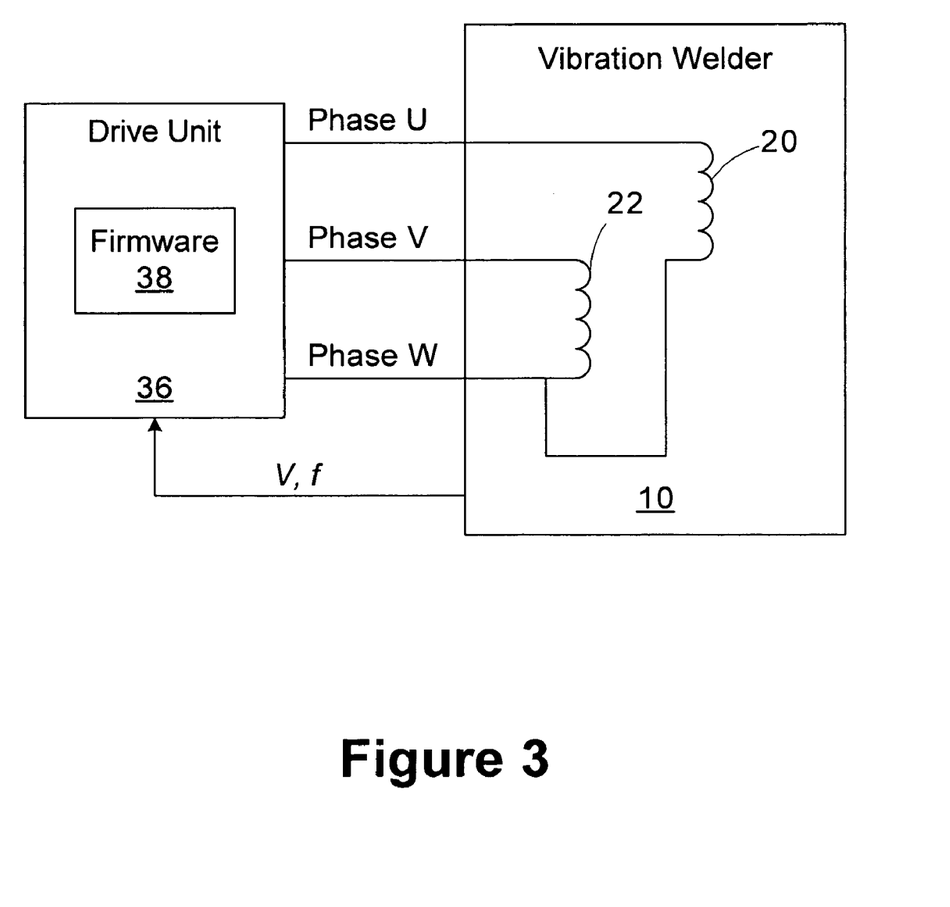
FIG. 3 is a simplified block diagram of a control system for driving the electromagnets in the welder of FIGS. 1 and 2.

Turning now to FIG. 3, a simplified block diagram of the drive unit 36 interfacing with the electromagnets 20, 22 in the vibration welder 10 is provided. The drive unit 36 is a three-phase drive unit, such as a model 1336Plus II, Powerflex 700, or Powerflex 700S drive unit commercially available from Rockwell Automation, Inc. of Milwaukee, Wis. The drive units 36 generates phase "U", "V", and "W" pulse width modulated (PWM) signals. The U phase signal is provided to the electromagnet 20 (i.e., the U electromagnet 20), and the V phase signal is provided to the electromagnet 22 (i.e., the V electromagnet 22. The W phase signal provides a common return for both electromagnets 20, 22. The drive unit 36 includes programmable firmware 38 that controls the signals generated thereby.

The vibration welder 10 sends configuration data to the drive unit 36 specifying parameters of the drive signals to be generated, specifically frequency and voltage. The voltage of the drive signals affects the magnitude of the current induced in the electromagnets 20, 22, and thus the magnitude of the horizontal movement of the vibration platen 24, and the frequency of the drive signals affects the rate of reciprocation. Reciprocation magnitude and frequency, as well as the pressure exerted by pressure cylinders 16 on the lift table 14 (shown in FIGS. 1 and 2) define the recipe parameters for the vibration welding process. These parameters may vary depending on the particular materials being used and the desired type of weld joint.

FIGS. 4-7 are circuit diagrams illustrating the operation of the drive unit 36 of FIG. 3 for generating the electromagnet drive signals. FIG. 8 shows a plot of the current and PWM voltage signals provided to the electromagnets 20, 22. The voltage curves represent terminal voltage measured with respect to the W phase.

Figure 4:
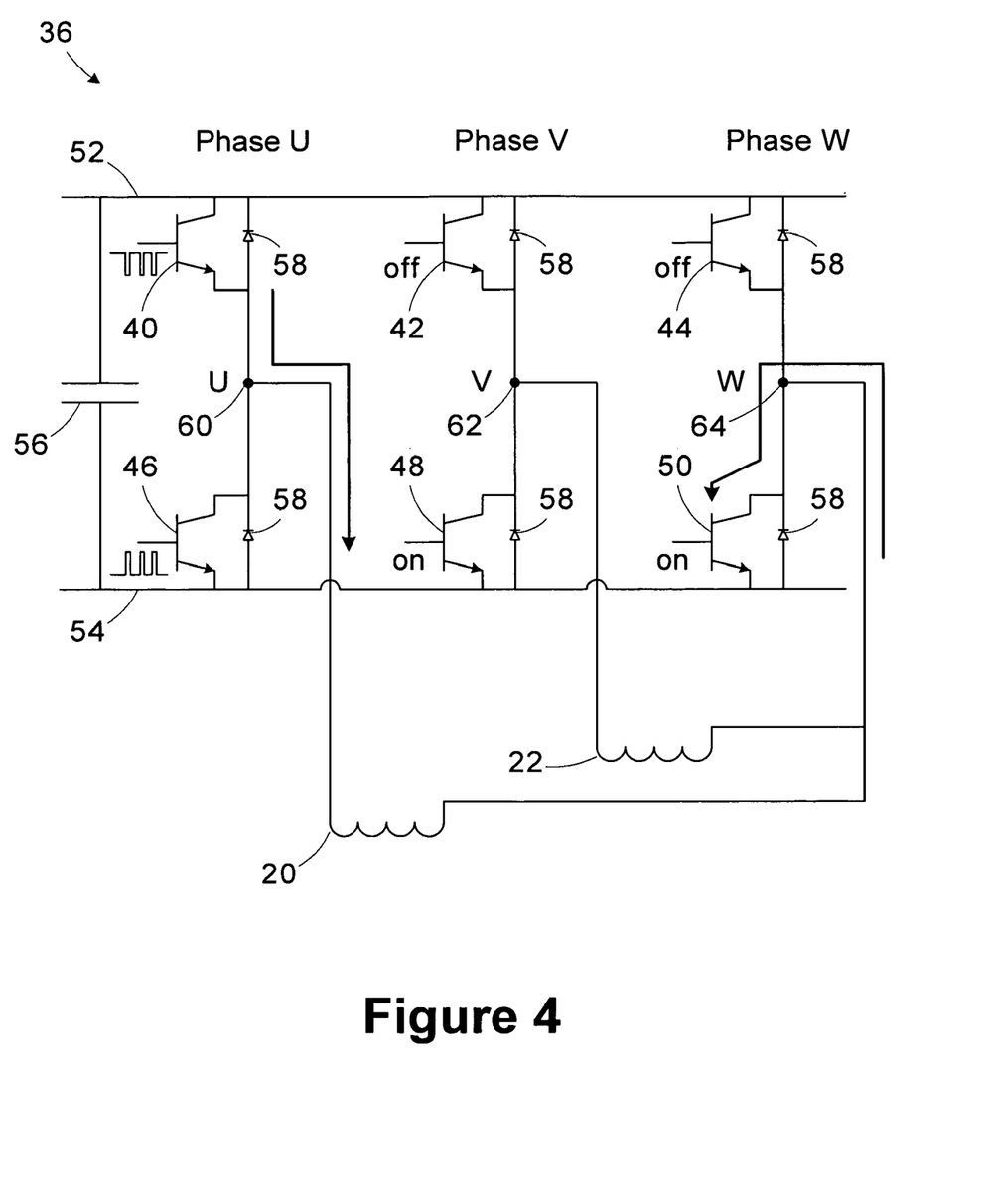
FIGS. 4-7 are circuit diagrams illustrating the operation of the drive unit of FIG. 3 for generating the electromagnet drive signals.

Referring first to FIG. 4, the general circuit arrangement of the drive unit 36 is described. The drive unit 36 includes upper phase U, V, and W transistors 40, 42, and 44, respectively, and lower phase U, V, and W transistors 46, 48, and 50, respectively coupled between a positive bus 52 (e.g., 600V) and a negative bus 54 (e.g., floating ground). A bus capacitor 56 is coupled between the positive and negative buses 52, 54. Flyback diodes 58 are provided for each of the transistors 40-50 to provide return paths for the current during switching. The outputs of the drive unit 36 are generated at nodes 60 (U phase), 62 (V phase), and 64 (W phase), respectively. The circuit arrangement of the drive unit 36 is conventional for a pulse width modulated (PWM) inverter, however the firmware 38 is configured to operate the drive unit 36 in a non-conventional manner to generate the drive signals for the electromagnets 20, 22.

The drive cycle is divided into four quarters, the first two driving the U electromagnet 20 and the second two driving the V electromagnet 22. The timing between the cycles depends on the frequency parameter communicated to the drive unit 36 by the vibration welder 10. The general direction of current flow is indicated in FIGS. 4-7 for illustrative purposes using arrows.

Still referring to FIG. 4, the control scheme for the first quarter is illustrated. The upper and lower U phase transistors 40, 46 are enabled using square waves with predetermined duty cycles to energize the U electromagnet 20 through node 60. The signal provided to the lower U phase transistor 46 is the compliment of that supplied to the upper U phase transistor 40, such that only one is active at any time. The duty cycle is determined based on the voltage defined for the drive signal, a higher duty cycle corresponding to a higher drive voltage. The upper V phase transistor 42 is held in an off state and the lower V phase transistor 48 is held in an on state, tying the V electromagnet 22 to the negative bus 54 to prevent it from being active at the same time as the U electromagnet 20. The upper W phase transistor 44 is held in an off state and the lower W phase transistor 50 is held in an on state to provide a return path to the negative bus 54 for the U electromagnet 20. As shown in FIG. 8, the current builds in the U electromagnet 20 during the first quarter.

Figure 5:
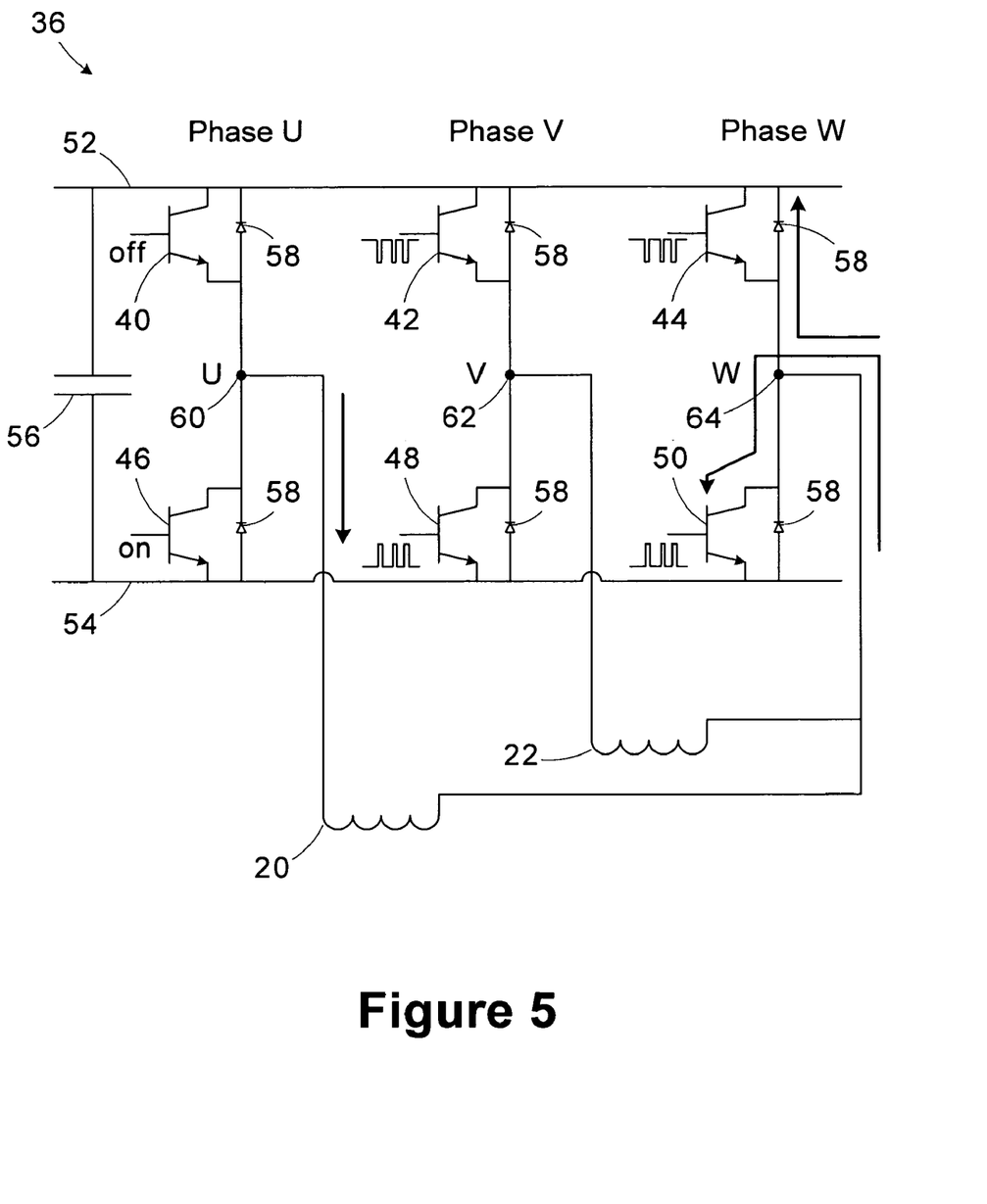

Referring next to FIG. 5, the control scheme for the second quarter is illustrated. The upper U phase transistor 40 is held in an off state, and the lower U phase transistor 46 is held in an on state. The upper and lower W phase transistors 44, 50 are enabled using complimentary square waves. This arrangement reverses the voltage on the U electromagnet 20, as seen in FIG. 8 and drives the down current to deenergize the U electromagnet 20 through node 64. During this quarter, the upper V phase transistor 42 and lower V phase transistor 48 also receive the same complimentary square wave signals as the upper W phase transistor 44 and lower W phase transistor 50. Because they see the same voltage, the voltage at node 62 remains the same as the voltage at node 64, and no current flows through the V electromagnet 22.

Figure 6:
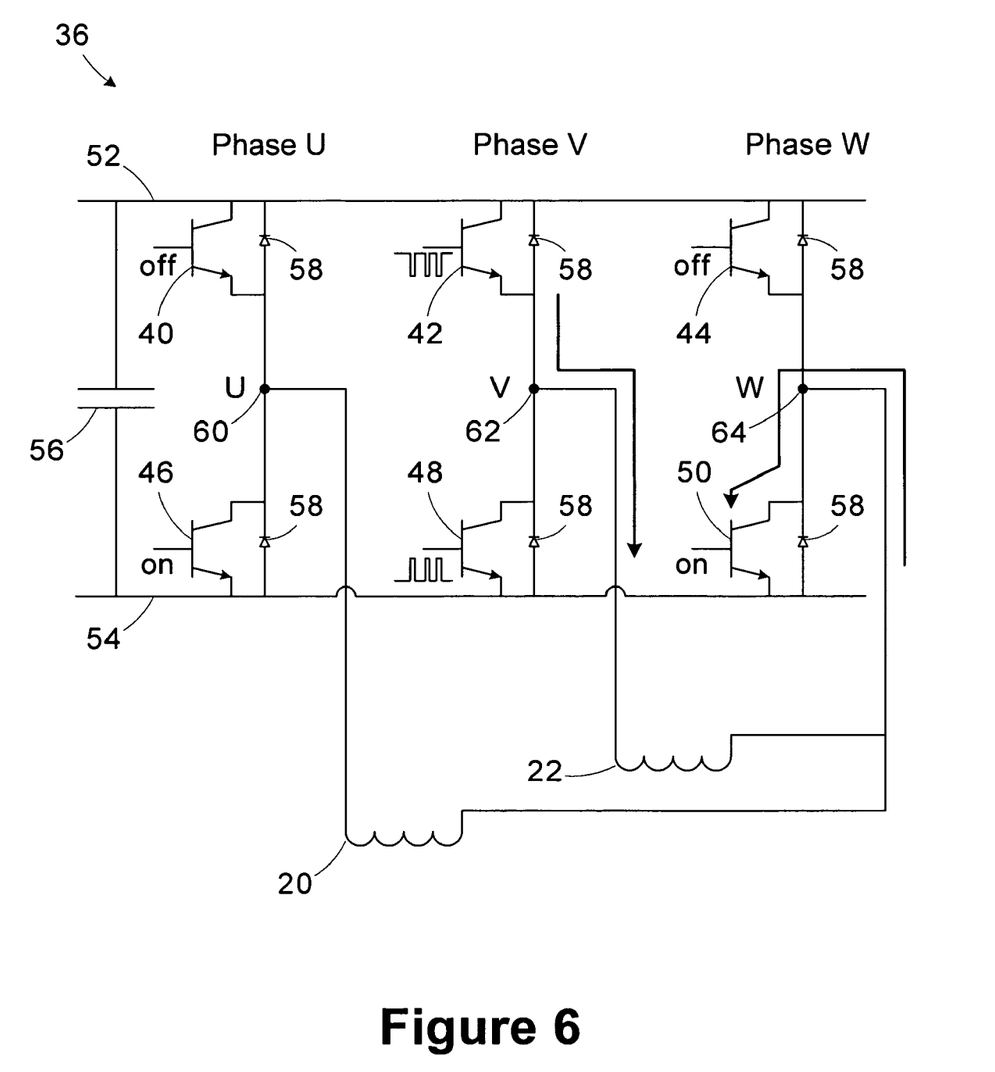

Turning now to FIG. 6, the control scheme for the third quarter is illustrated. The upper and lower V phase transistors 42, 48 are enabled using complimentary square waves to energize the V electromagnet 22 through node 62. The upper U phase transistor 40 is held in an off state and the lower U phase transistor 46 is held in an on state, tying the U electromagnet 20 to the negative bus 54 to prevent it from being active at the same time as the V electromagnet 22. The upper W phase transistor 44 is held in an off state and the lower W phase transistor 50 is held in an on state to provide a return path to the negative bus 54 for the V electromagnet 22. As shown in FIG. 8, the current builds in the V electromagnet 22 during the third quarter.

Figure 7:
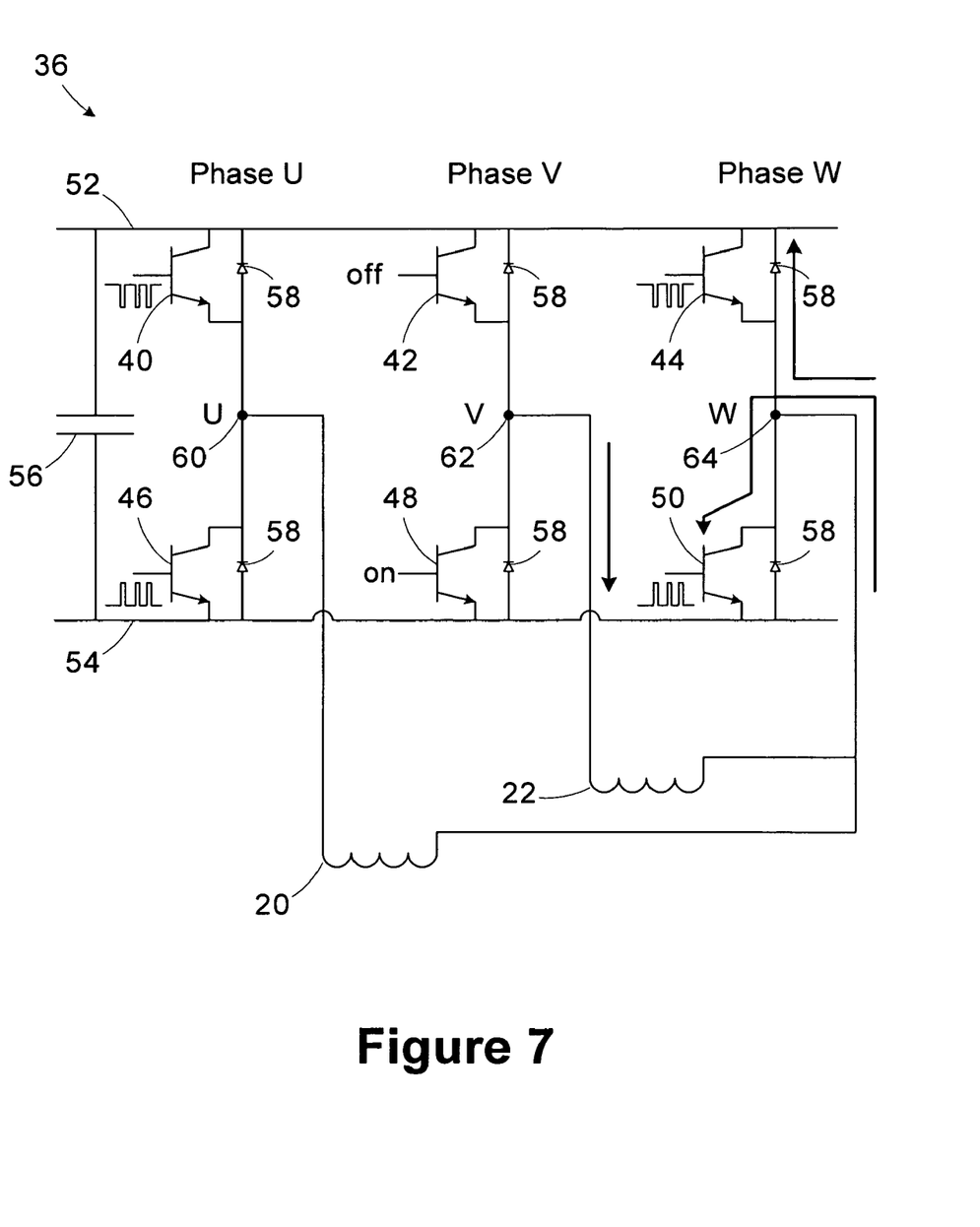
Figure 8:
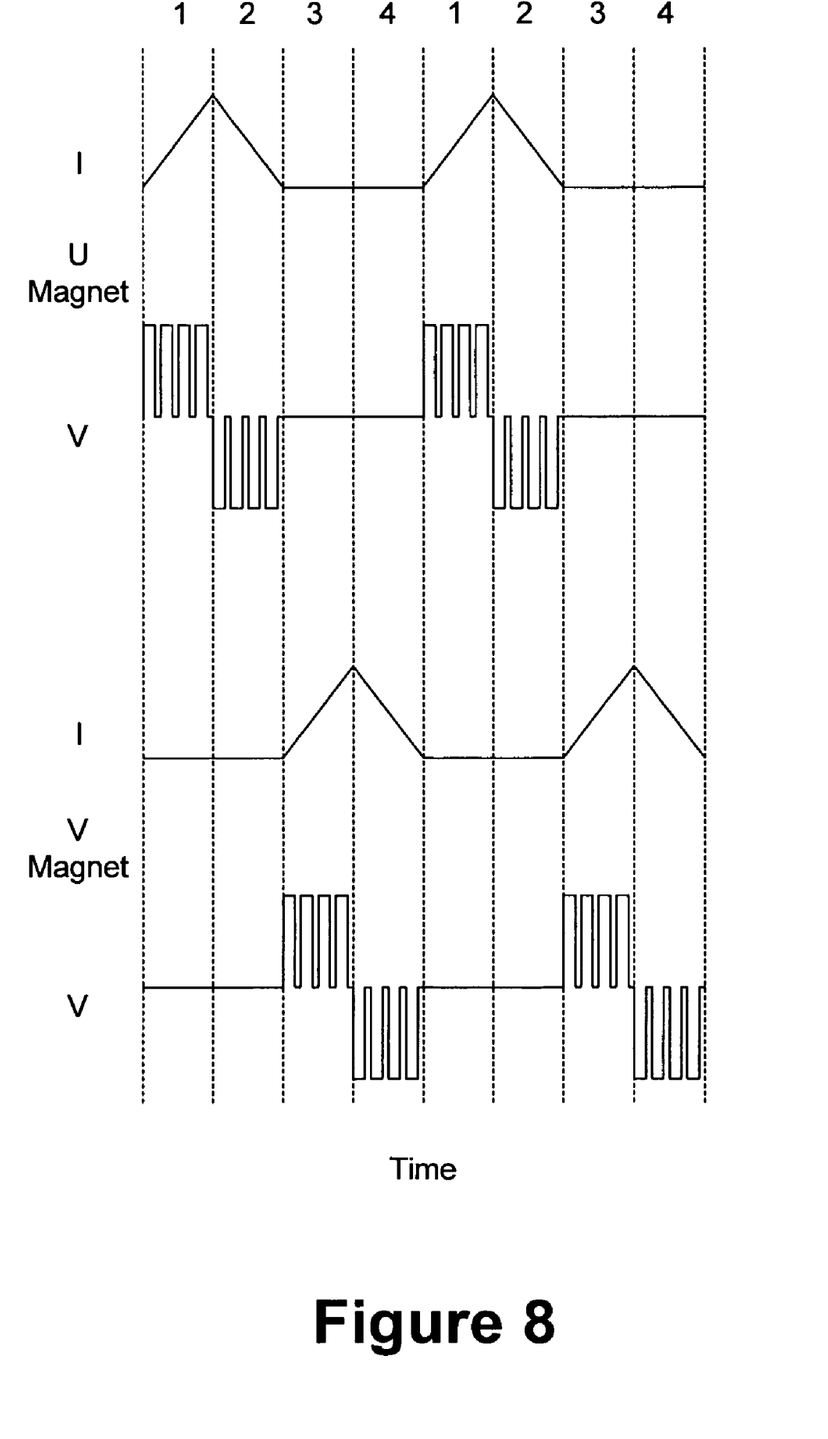
FIG. 8 is a graph illustrating the control signals and electromagnet drive signals generated by the drive unit of FIG. 3.

Referring to FIG. 7, the control scheme for the fourth quarter is illustrated. The upper V phase transistor 42 is held in an off state, and the lower V phase transistor 48 is held in an on state. The upper and lower W phase transistors 44, 50 are enabled using complimentary square waves. This arrangement reverses the voltage on the V electromagnet 22, as seen in FIG. 8 and drives the down current to deenergize the V electromagnet 22 through node 64. During this quarter, the upper U phase transistor 40 and lower U phase transistor 46 also receive the same complimentary square wave signals as the upper W phase transistor 44 and lower W phase transistor 50. Because they see the same voltage, the voltage at node 60 remains the same as the voltage at node 64, and no current flows through the U electromagnet 20.

Returning to FIG. 8, the drive unit 36 repeats the 4 quarters indefinitely until the welding process is stopped. The drive signals to the U electromagnet 20 and V electromagnet 22 are 180 degrees out of phase. At no time are both electromagnets 20, 22 energized, hence, they do not compete against one another in attracting the vibration platen 24 (shown in FIG. 1).

Figure 9:
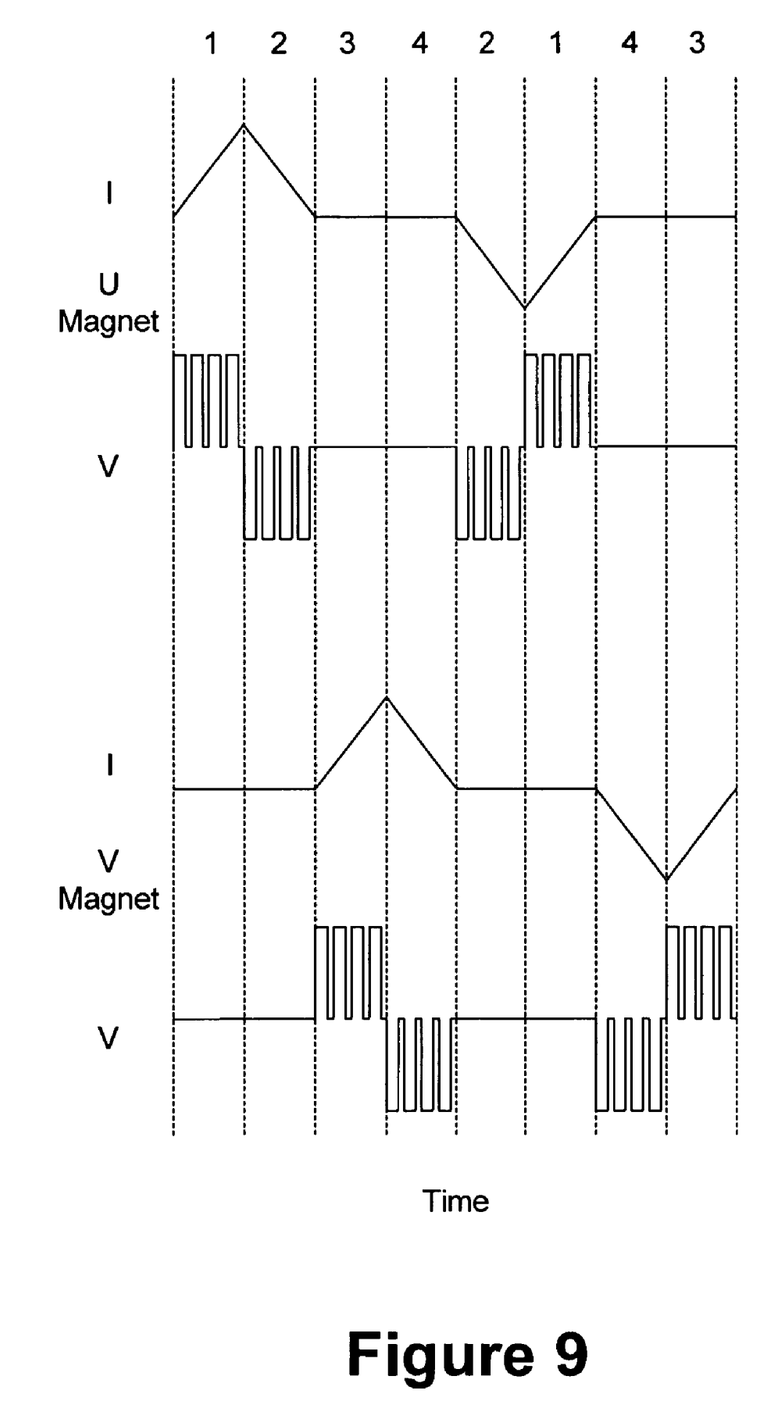
FIG. 9 is similar to FIG. 8 showing alternative control signals and electromagnetic drive signals.

Referring now to FIG. 9, an alternative control scheme is illustrated. The first four quarters are controlled as described above and shown in FIGS. 4-8. However, for the second four quarters, the positive and negative cycles are reversed to drive the current and voltage in a negative direction first, followed by driving the current and voltage in the positive direction. That is, order of the quarters is changed from 1, 2, 3, 4, 1, 2, 3, 4 as shown in FIG. 8, to 1, 2, 3, 4, 2, 1, 4, 3 for the control scheme illustrated in FIG. 9. This control scheme compensates for the floating nature of the negative bus 54. If the current is not completely driven down to a "zero" reference between cycles, a positive offset may develop over time. By reversing the sense of the second four quarters, any offset resulting from the first four quarters would be cancelled by an offset in the negative direction from the second four quarters. Again in FIG. 9, the drive signals to the U electromagnet 20 and V electromagnet 22 are 180 degrees out of phase. At no time are both electromagnets 20, 22 energized, hence, they do not compete against one another in attracting the vibration platen 24 (shown in FIG. 1).

The drive unit 36 and control scheme discussed herein results in drive signals to the electromagnets 20, 22 that do not overlap or exhibit resonance. Because the electromagnets 20, 22 do not compete the mechanical stresses seen by the vibration welder 10 are reduced, and the accuracy at which the horizontal movement magnitude and frequency of the vibration platen 24 can be controlled is enhanced.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A drive unit for use with a vibration welder having first and second electromagnets, each having first and second terminals, and being operable to reciprocate a vibration platen, comprising:
    phase U drive circuitry coupled to the first terminal of the first electromagnet;
    phase V drive circuitry coupled to the first terminal of the second electromagnet;
    phase W drive circuitry coupled to the second terminals of the first and second electromagnets; and
    control circuitry operable to control the phase U, V, and W drive circuitry to generate a first drive signal for energizing the first electromagnet and a second drive signal for energizing the second electromagnet.

2. The drive unit of claim 1, wherein the first and second drive signals are approximately 180 degrees out of phase.

3. The drive unit of claim 1, wherein the control circuitry comprises firmware programmed with instructions to control the phase U, V, and W drive circuitry.

4. The drive unit of claim 1, wherein the first and second drive signals comprise pulse width modulated voltage signals.

5. The drive unit of claim 1, wherein a control cycle of the drive unit is divided into four quarters, and the control circuitry is operable to generate the first drive signal to energize the first electromagnet during the first quarter, generate the first drive signal to deenergize the first electromagnet during the second quarter, generate the second drive signal to energize the second electromagnet during the third quarter, and generate the second drive signal to deenergize the second electromagnet during the fourth quarter.

6. The drive unit of claim 5, wherein the first drive signal comprises a first square wave voltage signal having a first duty cycle and a first polarity during the first quarter and a second polarity different from the first polarity during the second quarter, and the second drive signal comprises a second square wave voltage signal having the first duty cycle and a third polarity during the third quarter and a fourth polarity different from the third polarity during the fourth quarter.

7. The drive unit of claim 6, wherein the control cycle comprises a first control cycle, and the control circuitry is operable to implement a second control cycle subsequent to the first control cycle, and wherein during the second control cycle, the first and second polarities are reversed, and the third and fourth polarities are reversed.

8. The drive unit of claim 6, wherein the first square wave voltage signal controls a first current in the first electromagnet, and the control circuitry is operable to control the magnitude of the first current based on the first duty cycle.

9. The drive unit of claim 5, wherein the phase U drive circuitry comprises a phase U upper switch coupled between a positive bus and a phase U output terminal and a phase U lower switch coupled between a negative bus and the phase U output terminal, the phase V drive circuitry comprises a phase V upper switch coupled between the positive bus and a phase V output terminal and a phase V lower switch coupled between the negative bus and the phase V output terminal, and the phase W drive circuitry comprises a phase W upper switch coupled between the positive bus and a phase W output terminal and a phase W lower switch coupled between the negative bus and the phase W output terminal.

10. The drive unit of claim 9, wherein during the first quarter the control circuitry is operable to provide first control signal having a duty cycle to the phase U upper switch and a second control signal comprising a compliment of the first control signal to the phase U lower switch, hold the phase V upper switch and the and phase W upper switch in an off state, and hold the phase V lower switch and phase W lower switch in an on state.

11. The drive unit of claim 9, wherein during the second quarter the control circuitry is operable to provide first control signal having a duty cycle to the phase V upper switch and the phase W upper switch and a second control signal comprising a compliment of the first control signal to the phase V lower switch and the phase W lower switch, hold the phase U upper switch in an off state, and hold the phase U lower switch in an on state.

12. The drive unit of claim 9, wherein during the third quarter the control circuitry is operable to provide first control signal having a duty cycle to the phase V upper switch and a second control signal comprising a compliment of the first control signal to the phase V lower switch, hold the phase U upper switch and the and phase W upper switch in an off state, and hold the phase U lower switch and phase W lower switch in an on state.

13. The drive unit of claim 9, wherein during the fourth quarter the control circuitry is operable to provide first control signal having a duty cycle to the phase U upper switch and the phase W upper switch and a second control signal comprising a compliment of the first control signal to the phase U lower switch and the phase W lower switch, hold the phase V upper switch in an off state, and hold the phase V lower switch in an on state.

14. A vibration welder for welding two parts, comprising:
a first mounting holding the first part;
a second mounting holding the second part;
first and second electromagnets, each having first and second terminals;
a vibration platen coupled to the first mounting and disposed between the first and second electromagnets;
a drive unit, comprising:
phase U drive circuitry coupled to the first terminal of the first electromagnet;
phase V drive circuitry coupled to the first terminal of the second electromagnet;
phase W drive circuitry coupled to the second terminals of the first and second electromagnets; and
control circuitry operable to control the phase U, V, and W drive circuitry to generate a first drive signal for energizing the first electromagnet and a second drive signal for energizing the second electromagnet, the first and second drive signals alternately energizing the first and second electromagnets to reciprocate the vibration platen.

15. The vibration welder of claim 14, wherein the first and second drive signals are approximately 180 degrees out of phase.

16. The vibration welder of claim 14, wherein the control circuitry comprises firmware programmed with instructions to control the phase U, V, and W drive circuitry.

17. The vibration welder of claim 14, wherein the first and second drive signals comprise pulse width modulated voltage signals.

18. The vibration welder of claim 14, wherein a control cycle of the drive unit is divided into four quarters, and the control circuitry is operable to generate the first drive signal to energize the first electromagnet during the first quarter, generate the first drive signal to deenergize the first electromagnet during the second quarter, generate the second drive signal to energize the second electromagnet during the third quarter, and generate the second drive signal to deenergize the second electromagnet during the fourth quarter.

19. The vibration welder of claim 18, wherein the first drive signal comprises a first square wave voltage signal having a first duty cycle and a first polarity during the first quarter and a second polarity different from the first polarity during the second quarter, and the second drive signal comprises a second square wave voltage signal having the first duty cycle and a third polarity during the third quarter and a fourth polarity different from the third polarity during the fourth quarter.

20. The vibration welder of claim 19, wherein the control cycle comprises a first control cycle, and the control circuitry is operable to implement a second control cycle subsequent to the first control cycle, and wherein during the second control cycle, the first and second polarities are reversed, and the third and fourth polarities are reversed.

21. The vibration welder of claim 19, wherein the first square wave voltage signal controls a first current in the first electromagnet, and the control circuitry is operable to control the magnitude of the first current based on the first duty cycle.

22. The vibration welder of claim 18, wherein the phase U drive circuitry comprises a phase U upper switch coupled between a positive bus and a phase U output terminal and a phase U lower switch coupled between a negative bus and the phase U output terminal, the phase V drive circuitry comprises a phase V upper switch coupled between the positive bus and a phase V output terminal and a phase V lower switch coupled between the negative bus and the phase V output terminal, and the phase W drive circuitry comprises a phase W upper switch coupled between the positive bus and a phase W output terminal and a phase W lower switch coupled between the negative bus and the phase W output terminal.

23. The vibration welder of claim 22, wherein during the first quarter the control circuitry is operable to provide first control signal having a duty cycle to the phase U upper switch and a second control signal comprising a compliment of the first control signal to the phase U lower switch, hold the phase V upper switch and the and phase W upper switch in an off state, and hold the phase V lower switch and phase W lower switch in an on state.

24. The vibration welder of claim 22, wherein during the second quarter the control circuitry is operable to provide first control signal having a duty cycle to the phase V upper switch and the phase W upper switch and a second control signal comprising a compliment of the first control signal to the phase V lower switch and the phase W lower switch, hold the phase U upper switch in an off state, and hold the phase U lower switch in an on state.

25. The vibration welder of claim 22, wherein during the third quarter the control circuitry is operable to provide first control signal having a duty cycle to the phase V upper switch and a second control signal comprising a compliment of the first control signal to the phase V lower switch, hold the phase U upper switch and the and phase W upper switch in an off state, and hold the phase U lower switch and phase W lower switch in an on state.

26. The vibration welder of claim 22, wherein during the fourth quarter the control circuitry is operable to provide first control signal having a duty cycle to the phase U upper switch and the phase W upper switch and a second control signal comprising a compliment of the first control signal to the phase U lower switch and the phase W lower switch, hold the phase V upper switch in an off state, and hold the phase V lower switch in an on state.

* * * * *